United States Patent
Kon et al.

(10) Patent No.: US 11,573,190 B2
(45) Date of Patent: *Feb. 7, 2023

(54) CALIBRATION METHOD FOR X-RAY MEASURING DEVICE

(71) Applicant: MITUTOYO CORPORATION, Kanagawa (JP)

(72) Inventors: Masato Kon, Kanagawa (JP); Hiromu Maie, Kanagawa (JP); Seiji Sasaki, Kanagawa (JP); Jyota Miyakura, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,304

(22) Filed: Jun. 28, 2021

(65) Prior Publication Data
US 2021/0404976 A1 Dec. 30, 2021

(30) Foreign Application Priority Data
Jun. 29, 2020 (JP) .............................. JP2020-111821

(51) Int. Cl.
*G01N 23/083* (2018.01)
*G01N 23/18* (2018.01)

(52) U.S. Cl.
CPC .......... *G01N 23/083* (2013.01); *G01N 23/18* (2013.01); *G01N 2223/303* (2013.01)

(58) Field of Classification Search
CPC .................................................... A61B 6/583
See application file for complete search history.

(56) References Cited

U.S. PATENT DOCUMENTS

| | | | | |
|---|---|---|---|---|
| 6,224,257 B1* | 5/2001 | Launay | ................. | A61B 6/583 250/252.1 |
| 8,764,290 B2* | 7/2014 | O'Hare | ................. | A61B 6/583 378/207 |
| 11,344,276 B2* | 5/2022 | Kon | ..................... | A61B 6/0407 |
| 2011/0128388 A1* | 6/2011 | Pai | ........................ | G01B 11/03 348/187 |
| 2019/0001156 A1* | 1/2019 | Tulik | ................... | A61N 5/1081 |
| 2019/0274654 A1* | 9/2019 | Matsumiya | .......... | G01N 23/046 |

FOREIGN PATENT DOCUMENTS

JP 2000-298105 10/2000

* cited by examiner

*Primary Examiner* — Hoon K Song
(74) *Attorney, Agent, or Firm* — Greenblum & Bernstein, P.L.C.

(57) ABSTRACT

A calibration method for an X-ray measuring device includes mounting a calibration tool on a rotating table, identifying centroid positions from an output of an X-ray image detector, calculating projection transformation matrixes from the centroid positions and known relative positional intervals, repeating to identify the centroid positions from the output of the X-ray image detector and to calculate the projection transformation matrixes from the centroid positions and known relative positional intervals while the rotating table is rotated twice or more by a predetermined angle, and calculating a rotation center position of the rotating table on the basis of the projection transformation matrixes. The calibration method thereby allows easy calculation of the rotation center position of the rotating table on which an object to be measured is mounted in a rotatable manner, with the simple process.

9 Claims, 5 Drawing Sheets

CALIBRATION METHOD FOR X-RAY MEASURING DEVICE

CROSS-REFERENCE TO RELATED APPLICATION

The disclosure of Japanese Patent Application No. 2020-111821 filed on Jun. 29, 2020 including specifications, drawings and claims is incorporated herein by reference in its entirety.

TECHNICAL FIELD

The present invention relates to calibration methods for an X-ray measuring device, and particularly relates to a calibration method for an X-ray measuring device that can easily calculate a rotation center position of a rotating table on which an object to be measured is mounted in a rotatable manner, with a simple process.

BACKGROUND ART

Conventionally, X-ray measuring devices (e.g., X-ray computed tomography scanners for measurement), which can measure a three-dimensional shape of an object to be measured using an X-ray, have been primarily used for observation and inspection of defects, such as voids in casting parts, welding defects in welded parts, and defects in circuit patterns of electronic circuit parts, which are difficult to identify from external appearance. However, in recent years, the increasingly widespread use of 3D printers have increased demands for 3D measurement of the interior of workpieces with improved accuracy. To meet these demands, the X-ray measuring devices are expected to further increase the accuracy of dimension measurement is required of.

To perform a high accurate dimension measurement by the X-ray measuring device, as described in Japanese Patent Application Laid-Open No. 2000-298105, it is important to perform various calibrations specific to the device prior to the start of the measurement.

SUMMARY OF INVENTION

Technical Problem

However, in a calibration method described in Japanese Patent Application Laid-Open No. 2000-298105, to calculate the rotation center position of a rotating table, by rotating a calibration tool by 180 degrees, a center channel corresponding to a rotational center is calculated on a detection surface of an X-ray detector. The distance between an X-ray source and the rotation center position has to be calculated in another process. In other words, conventionally, the calculation of the rotation center position of the rotating table is complicated and difficult.

The present invention has been made in order to solve the above-described problems in the conventional technique, and an object thereof is to provide a calibration method for an X-ray measuring device that can easily calculate a rotation center position of a rotating table on which an object to be measured is mounted in a rotatable manner, with a simple process.

Solution to Problem

To solve the foregoing problems, a first aspect of the present invention provides a calibration method for an X-ray measuring device that performs three-dimension measurement of an object to be measured using an X-ray. The X-ray measuring device includes an X-ray source that generates an X-ray, a rotating table on which the object to be measured is mounted in a rotatable manner, and an X-ray image detector that detects the X-ray having passed through the object to be measured. The calibration method includes mounting a calibration tool in which one or more reference objects having a shape identifiable by a projected image to the X-ray image detector can be disposed at known relative positional intervals in N (N≥4) or more positions, on the rotating table; identifying a position of a feature point of the projected image of each of the one or more reference objects in the N positions, from an output of the X-ray image detector while the X-ray is applied to the calibration tool; calculating a transformation matrix for projective transformation of the one or more reference objects on a detection surface of the X-ray image detector, on the basis of the position of the feature point of the projected image of each of the one or more reference objects in the N positions and the known relative positional intervals; repeating to identify the position of the feature point of the projected image of each of the one or more reference objects in the N positions, from the output of the X-ray image detector while the X-ray is applied to the calibration tool and to calculate the transformation matrix for projective transformation of the one or more reference objects on the detection surface of the X-ray image detector, on the basis of the position of the feature point of the projected image of each of the one or more reference objects in the N positions and the known relative positional intervals, while the rotating table is rotated twice or more by a predetermined angle; and calculating a rotation center position of the rotating table on the basis of the transformation matrix.

A second aspect of the present invention provides the calibration method in which when all the one or more reference objects are disposed on only a single plane of the calibration tool, the transformation matrix may be defined as a projection transformation matrix, and when the one or more reference objects are disposed in three dimensions, N may be 6 and the transformation matrix may be defined as a projection matrix.

A third aspect of the present invention provides the calibration method in which, in calculating the rotation center position of the rotating table on the basis of the transformation matrix, a rotary axis of the rotating table may further be calculated.

A forth aspect of the present invention provides the calibration method in which, in calculating the rotation center position of the rotating table on the basis of the transformation matrix, on an assumption that the X-ray source and the X-ray image detector rotate instead of the rotating table, the rotation center position of the rotating table may be calculated by calculating an absolute position of the X-ray source for each rotation by the predetermined angle on the basis of the transformation matrix.

A fifth aspect of the present invention provides the calibration method in which, when the absolute position of the X-ray source is calculated by rotating the rotating table four times or more at the predetermined angle, a distance between the X-ray source and the X-ray image detector and a position of a foot of a normal from the X-ray source to the X-ray image detector may be regarded as variables, and a distance error between a position on a locus of a provisional true circle and the absolute position of the X-ray source may be evaluated so as to calculate the distance between the X-ray source and the X-ray image detector and a position of the foot of the normal from the X-ray source to the X-ray image detector, the provisional true circle being obtained by fitting the absolute positions of the X-ray source calculated on the basis of the transformation matrix to a true circle.

A sixth aspect of the present invention provides the calibration method in which, in calculating the rotation center position of the rotating table on the basis of the transformation matrix, a center position of a locus obtained by fitting change in the absolute position of the X-ray source to a true circle may be calculated, and the center position may be set as the rotation center position of the rotating table.

A seventh aspect of the present invention provides the calibration method in which, in calculating the rotary axis of the rotating table, an angle of inclination from a horizontal plane of the locus may further be calculated, and the rotary axis may be calculated from the angle of inclination and the rotation center position.

An eighth aspect of the present invention provides the calibration method in which, each of the one or more reference objects may be a sphere.

A ninth aspect of the present invention provides the calibration method in which, the position of the feature point of the projected image of each of the one or more reference objects may be a centroid position of the projected image.

The present invention allows easy calculation of the rotation center position of the rotating table on which the object to be measured is mounted in a rotatable manner, with the simple process.

These and other novel features and advantages of the present invention will become apparent from the following detailed description of preferred embodiments. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, an embodiment of the present invention will be described in details with reference to the drawings. The present invention is not limited by the contents of the embodiment and examples described below. Moreover, component members described hereinbelow include those easily conceived by a person skilled in the art and those substantially identical, i.e., their full scope of equivalents. Furthermore, the component members disclosed hereinbelow can appropriately be combined or selected where necessary.

Figure 1:
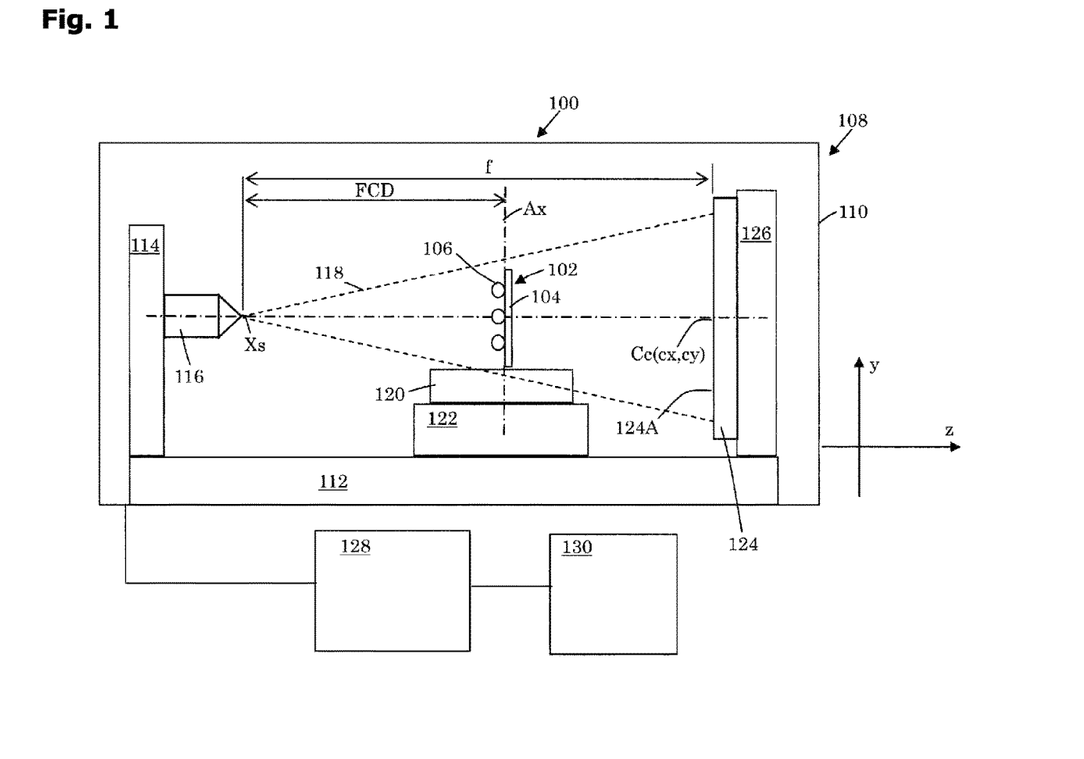
FIG. 1 is a schematic side view showing a basic structure of an X-ray measuring device according to an embodiment of the present invention.

FIG. 1 shows an embodiment of the present invention. In FIG. 1, a description is given on an assumption that a width direction with respect to the page of FIG. 1 corresponds to a z-axis direction, a longitudinal direction with respect to the page corresponds to a y-axis direction, and a direction perpendicular to the page corresponds to an x-axis direction.

An X-ray measuring device 100 is a device for measuring a 3D shape of an object to be measured using an X-ray. As shown in FIG. 1, the X-ray measuring device 100 includes a body unit 108, a host computer 128, and a motion controller 130.

Figure 2:
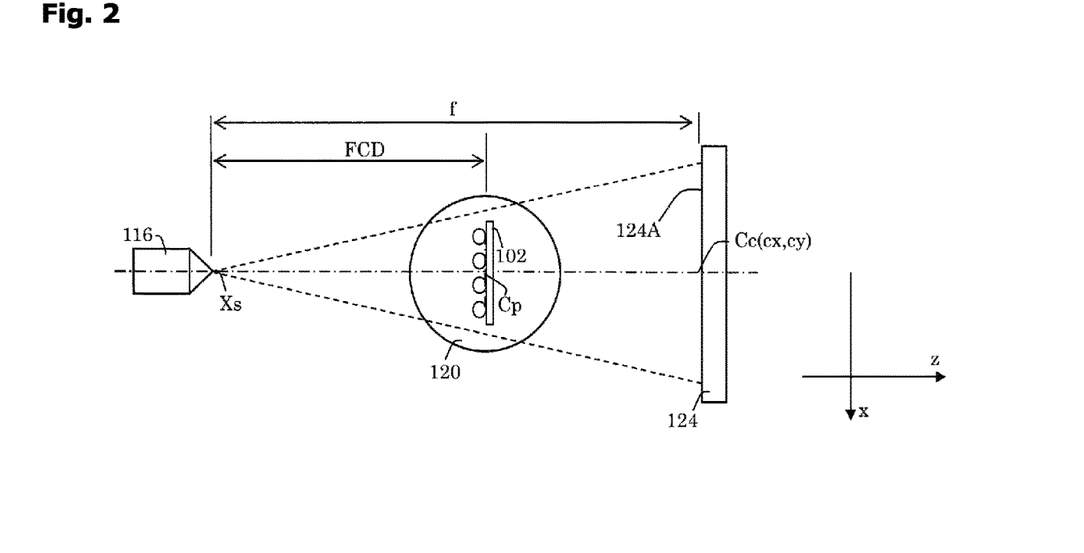
FIG. 2 is a schematic top view showing only essential parts of the X-ray measuring device of FIG. 1.
Figure 3A:
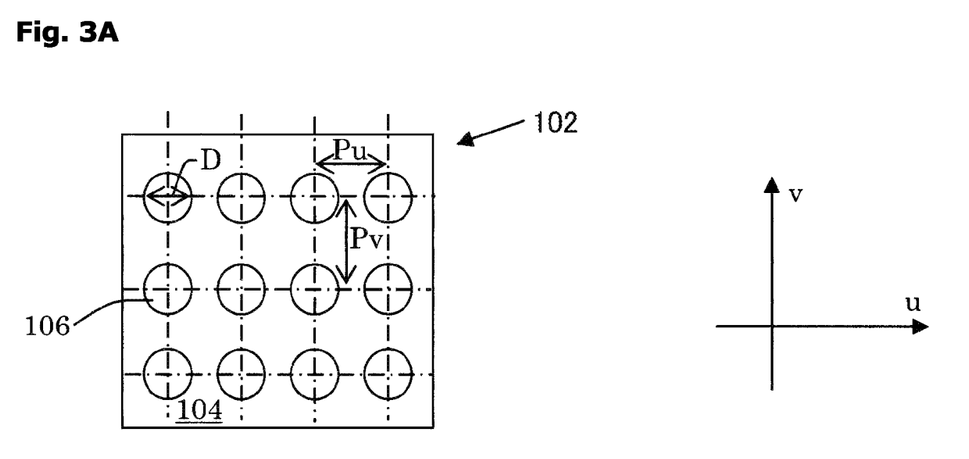
FIG. 3A is a front view showing a calibration tool of FIG. 1.
Figure 3B:
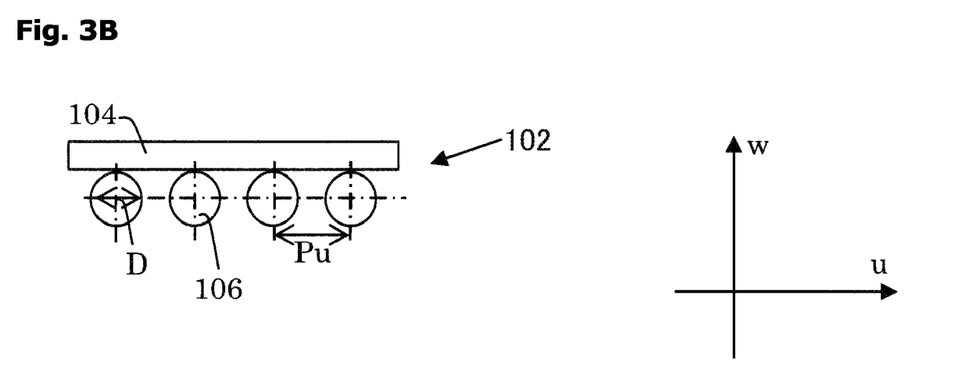
FIG. 3B is a top view showing the calibration tool of FIG. 1.

In FIGS. 1 and 2, a calibration tool 102, instead of an object to be measured, is mounted on a rotating table 120. As shown in FIGS. 3A and 3B, the calibration tool 102 is made of a material (for example, aluminum or the like) that can transmit an X-ray 118. The calibration tool 102 includes a plurality (e.g., the number (N) is 4*3=12) of spheres (reference objects) 106 having a diameter (D) that are arranged at known relative positional intervals (Pu and Pv) on a plate member 104. In other words, the spheres 106 are disposed in twelve positions at the known relative positional intervals of Pu and Pv. In the calibration tool 102, all the spheres 106 are mounted on only one plane. At the same time, the relative positions X(1-12) of the twelve spheres 106 i.e. the spheres 106 arranged in the twelve positions have already known. (The notation "(X(1-12)" and "X1-X12" are interchangeable. The same denotation will be adopted below.) The sphere 106 is simple in shape, and has such a shape that can be easily identified in a projected image to an X-ray image detector 124. In FIG. 3A, a width direction with respect to the page of FIG. 1 is a u-axis direction, a vertical direction with respect to the page is a v-axis direction, and a direction perpendicular to the page is a w-axis direction.

As shown in FIG. 1, the body unit 108 includes an X-ray shielding cover 110 for preventing leakage of the X-ray 118, an X-ray source 116 that generates the X-ray 118, the rotating table 120 on which the object to be measured (not shown) is mounted in a rotatable manner, and the X-ray image detector 124 that detects the X-ray 118 having passed through the object to be measured. The X-ray shielding cover 110, the X-ray source 116, the rotating table 120, and the X-ray image detector 124 are provided on a base 112. The X-ray source 116 is provided on a source support 114 disposed on the base 112. The source support 114 may include a linear motion mechanism that allows movement of the X-ray source 116 in three axial directions of x, y, and z. The rotating table 120 is provided on a table support 122 disposed on the base 112. The table support 122 includes a linear motion mechanism that allows movement of the object to be measured in the three axial directions of x, y, and z. The table support 122 may further include an inclination mechanism that allows inclination adjustment of a rotary axis Ax of the rotating table 120. The X-ray image detector 124 has a two-dimensional detection surface 124A that is sensitive to the X-ray 118. The X-ray image detector 124 is supported by a detector support 126 disposed on the base 112. The detector support 126 may also include a linear motion mechanism that allows movement of the X-ray image detector 124 in three axial directions of x, y, and z. The X-ray 118 generated from the X-ray source 116 is adjusted such that radiation beam thereof expands conically in the z-axis direction, with a center line thereof crossing the rotary axis Ax of the rotating table 120 and coinciding with a normal of the detection surface 124A of the X-ray image detector 124.

The host computer 128 shown in FIG. 1 controls the source support 114, the X-ray source 116, the rotating table 120, the table support 122, the X-ray image detector 124, and the detector support 126, which are included in the body unit 108. The host computer 128 can read and execute programs stored in a not-illustrated storage unit to automatically or semi-automatically perform measurement operations and calibration of the X-ray measuring device 100. In other words, in the measurement operations of the X-ray measuring device 100, for example, the host computer 128 reconstructs data of projected images obtained by the X-ray image detector 124, and generates three-dimensional volume data of the object to be measured.

Figure 7A:
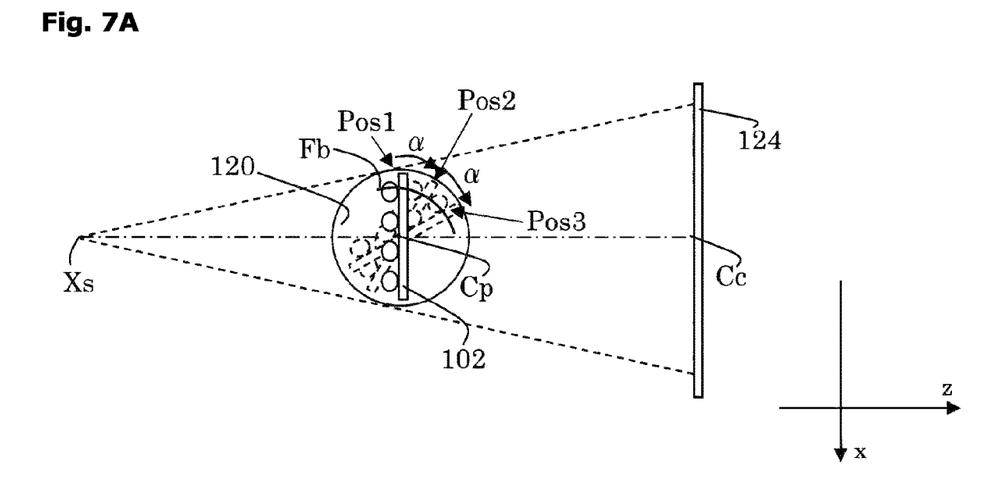
FIG. 7A is a diagram showing a predetermined angle and a locus of a sphere when a rotating table rotates.
Figure 7B:
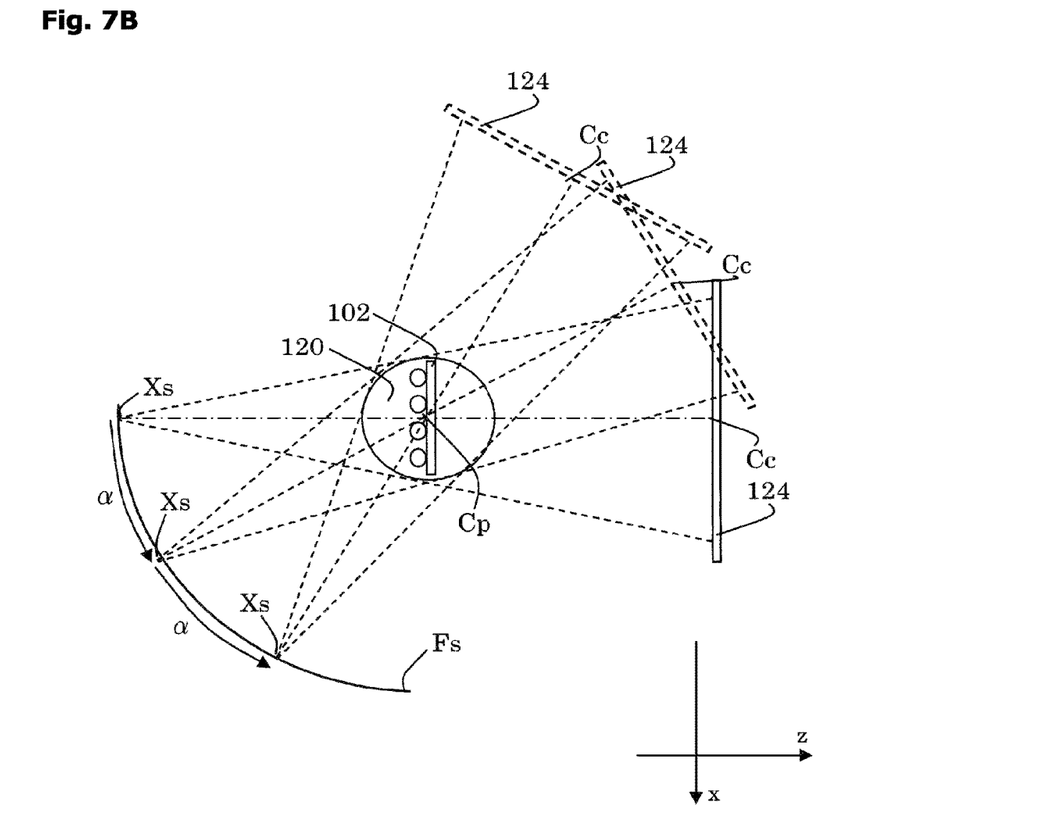
FIG. 7B is a diagram showing a locus of the absolute position of the X-ray source on an assumption that the X-ray source and the X-ray image detector rotate.

In the calibration of the X-ray measuring device 100, the host computer 128 can calculate, on an assumption that the X-ray source 116 has rotated instead of the rotating table 120, an absolute position Xs of the X-ray source 116 in a k-th ($1 \leq k \leq Q$; $Q \geq 3$) assumed rotational position, from a projection transformation matrix (transformation matrix) Hk with three rows and three columns in a k-th rotational position Posk of the rotating table 120, using, for example, relationship indicated by the following series of expressions (FIGS. 7A and 7B). The host computer 128 calculates a rotation center position Cp of the rotating table 120 (that is, the host computer 128 calculates the rotation center position Cp of the rotating table 120 on the basis of the projection transformation matrix Hk).

Specifically, an internal parameter matrix A represented by the expression (1) is defined from a distance f between the X-ray source 116 and the X-ray image detector 124 as well as a position Cc (cx and cy) of a foot of a normal from the X-ray source 116 to the X-ray image detector 124. Note that, when an aspect ratio of a pixel of the X-ray image detector 124 differs, the distance f in the first row and the first column of the internal parameter matrix A is slightly different in value from the distance f in the second row and the second column of the internal parameter matrix A. A skew S related to distortion of an image may be used in the first row and the second column of the internal parameter matrix A, but the skew S is set at 0 in the present embodiment.

Expression 1

$$A = \begin{bmatrix} f & 0 & cx \\ 0 & f & cy \\ 0 & 0 & 1 \end{bmatrix} \quad (1)$$

In this case, a rotation matrix Rk of the k-th assumed rotational position has three rows and three columns which are consisted of three column vectors rk1, rk2, and rk3. The rotation matrix Rk can be represented by the expression (2).

$$Rk = [rk1 \; rk2 \; rk3] \quad (2)$$

Here, the projection transformation matrix Hk can be decomposed as in the expression (3), using a translation matrix Tk (translation vector of one column) of the k-th assumed rotational position and the expressions (1) and (2).

$$Hk = A[rk1 \; rk2 \; Tk] \quad (3)$$

As shown in the expression (4), the absolute position Xs of the X-ray source 116 in the k-th assumed rotational position can be calculated from the expression (3). Note that, "–inv( )" represents the inverse of a matrix.

$$Xs = -inv(Rk)*Tk \quad (4)$$

Furthermore, the host computer 128 can also calculate absolute positions Xa(1 to N) of the spheres 106, using the internal parameter matrix A and the projection transformation matrix Hk. In images, the absolute positions Xa(1 to N) of the spheres 106 can be calculated by disposing the respective spheres 106 in a space using information about the known relative positional intervals Pu and Pv of the spheres 106, the distance f, and the position Cc (cx and cy), and performing coordinate transformation to actual positions using rotation and translation information contained in the projection transformation matrix Hk.

When the distance f between the X-ray source 116 and the X-ray image detector 124 as well as the position Cc (cx and cy) of the foot of the normal from the X-ray source 116 to the X-ray image detector 124 are unknown, the host computer 128 calculates a Q number of absolute positions Xs of the X-ray source 116 using the expression (4) by substituting appropriate values into the distance f and the position Cc (cx and cy), which are regarded as variables, i.e., on the basis of the projection transformation matrix Hk (k=1 to Q). The host computer 128 fits the calculated Q number of absolute positions Xs of the X-ray source 116 to a true circle (provisional true circle) by, for example, the least square method. The host computer 128 then evaluates a distance error between each of the positions on a locus of the provisional true circle and the corresponding one of the Q numbers of absolute positions Xs of the X-ray source 116, and thereby calculates the distance f and the position Cc (cx and cy) which minimizes the distance error. In this case, the total number Q of the rotational positions is 4 or more, in other words, the rotating table 120 is rotated 4 or more times by a predetermined angle α.

The motion controller 130 shown in FIG. 1 is connected to the host computer 128, and controls the X-ray source 116 and the rotation and movement of the rotating table 120 of the body unit 108 and also controls various mechanisms of the body unit 108.

Next, the measurement operation of the X-ray measuring device 100 will be briefly described.

In measuring operation, an object to be measured mounted on the rotating table 120 is rotated while being irradiated with the X-ray 118, to collect projected images from a plurality of angular directions. Commonly, an angle division number is of the order of 1000 to 6000. The collected projected images are subjected to a reconstruction processing with respect to slice planes, which horizontally traverse the object to be measured, as reference planes, to generate 3D volume data (3D images) of the object to be measured.

Next, a calibration method of the X-ray measuring device 100 will be described with reference to FIGS. 4 to 7B. Here, the host computer 128 performs all computations. For example, when k=1, the k-th rotational position Posk represents a rotational position Post. When N=12 and N is the number of the spheres 106 in the k-th rotational position Posk, centroid positions ImPosk_Sphr_(1-N) represent respective centroid positions ImPosk_Sphr_1 to ImPosk_Sphr_12 of the twelve spheres 106.

Figure 4:
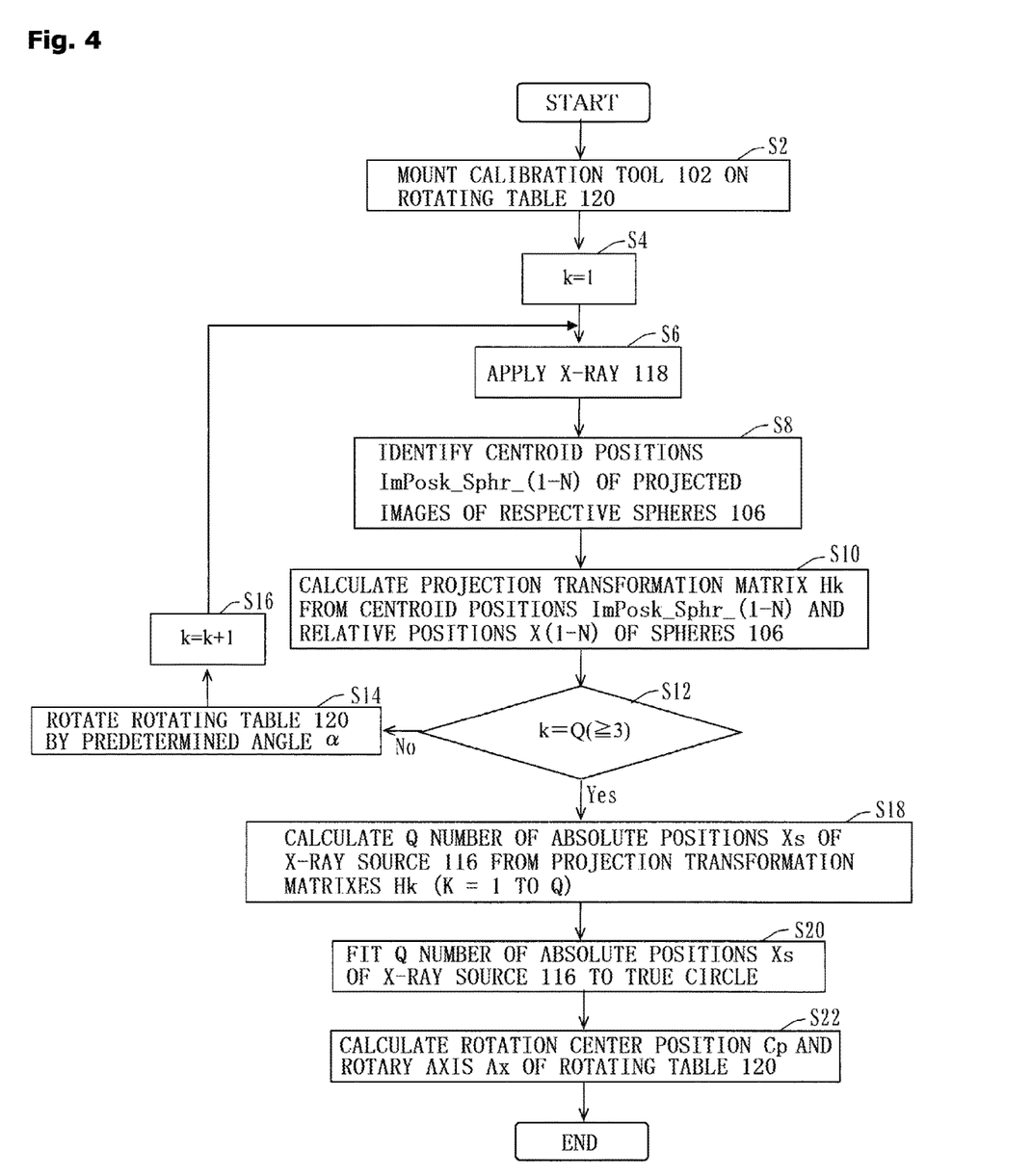
FIG. 4 is a flowchart showing calibration procedures of the X-ray measuring device according to the embodiment of the present invention.

First, the calibration tool 102, which includes the spheres 106 arranged at the known relative positional intervals Pu and Pv, is mounted on the rotating table 120 (step S2 of FIG. 4; a mounting step). A state of not rotating the rotating table 120 is set at k=1 (step S4 of FIG. 4).

Next, the X-ray 118 is applied to the calibration tool 102 (step S6 of FIG. 4). The centroid positions (positions of feature points) ImPosk_Sphr_(1-12) of the projected images of the respective N (N=12) number of spheres 106 are identified from an output of the X-ray image detector 124 (step S8 of FIG. 4; steps S6 to S8 correspond to a feature position calculation step).

Next, the projection transformation matrix Hk used to perform projective transformation of the spheres 106 to the detection surface 124A of the X-ray image detector 124 is calculated from the centroid positions ImPosk_Sphr_(1-12) of the projected images of the respective twelve spheres 106 and the relative positions X(1-12) of the spheres 106 (step S10 of FIG. 4; a transformation matrix calculation step).

Next, whether or not the number k of the rotational positions Posk is Q or greater (Q may be three or greater in the present embodiment) is determined (step S12 of FIG. 4). If the number k of the rotational positions Posk is not Q or more (Q≥3) (No in step S12 of FIG. 4), the rotating table 120 is rotated by the predetermined angle α (step S14 of FIG. 4). The number k of the rotational positions Posk is incremented by one (step S16 of FIG. 4), and the process from step S6 to step S12 is repeated (step S6 to step S16; a rotation and detection step). If the number k of the rotational positions Posk is Q or more (Q≥3) (Yes in step S12 of FIG. 4), the process proceeds to step S18. That is, in the rotation and detection step, the rotating table 120 is rotated twice or more by the predetermined angle α, and the feature position calculation step and the transformation matrix calculation step are repeated. In the present embodiment, the predetermined angle α is, for example, a constant value of 30 degrees, but is not limited thereto, and may be a smaller angle or varied each time.

Next, the rotation center position Cp and the rotary axis Ax of the rotating table 120 are calculated on the basis of the projection transformation matrixes Hk (k=1 to Q) (a center position calculation step). Details of the center position calculation step will be specifically described.

Figure 5:
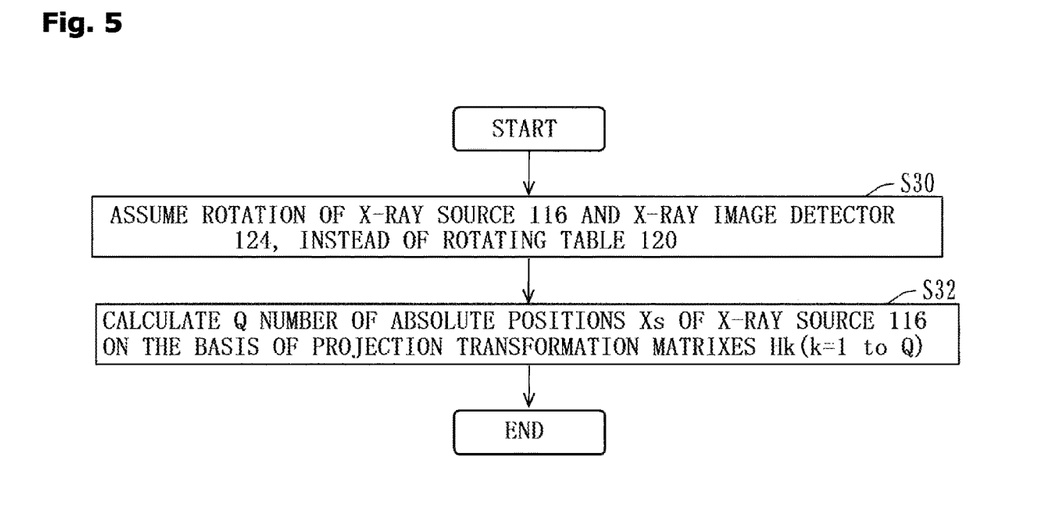
FIG. 5 is a detailed flowchart of a step of calculating an absolute position of an X-ray source of FIG. 4.

First, as shown in FIG. 5, it is assumed that the X-ray source 116 and the X-ray image detector 124, instead of the rotating table 120, are rotated (step S30 of FIG. 5). FIG. 7A shows the predetermined angle α and a locus Fb of the sphere 106 when the rotating table 120 is rotated. FIG. 7B shows a locus Fs of the absolute position Xs of the X-ray source 116, on an assumption that the X-ray source 116 and the X-ray image detector 124 are rotated.

Next, the absolute position Xs of the X-ray source 116 for each rotation by the predetermined angle α, that is, the Q number of absolute positions Xs of the X-ray source 116 are calculated on the basis of the projection transformation matrixes Hk (k=1 to Q) (step S32 of FIG. 5).

When the Q number of absolute positions Xs of the X-ray source 116 are calculated in the center position calculation step, a certain case will be discussed below with reference to FIG. 6. The case is that the distance f between the X-ray source 116 and the X-ray image detector 124 as well as the position Cc of the foot of the normal from the X-ray source 116 to the X-ray image detector 124 are unknown.

Figure 6:
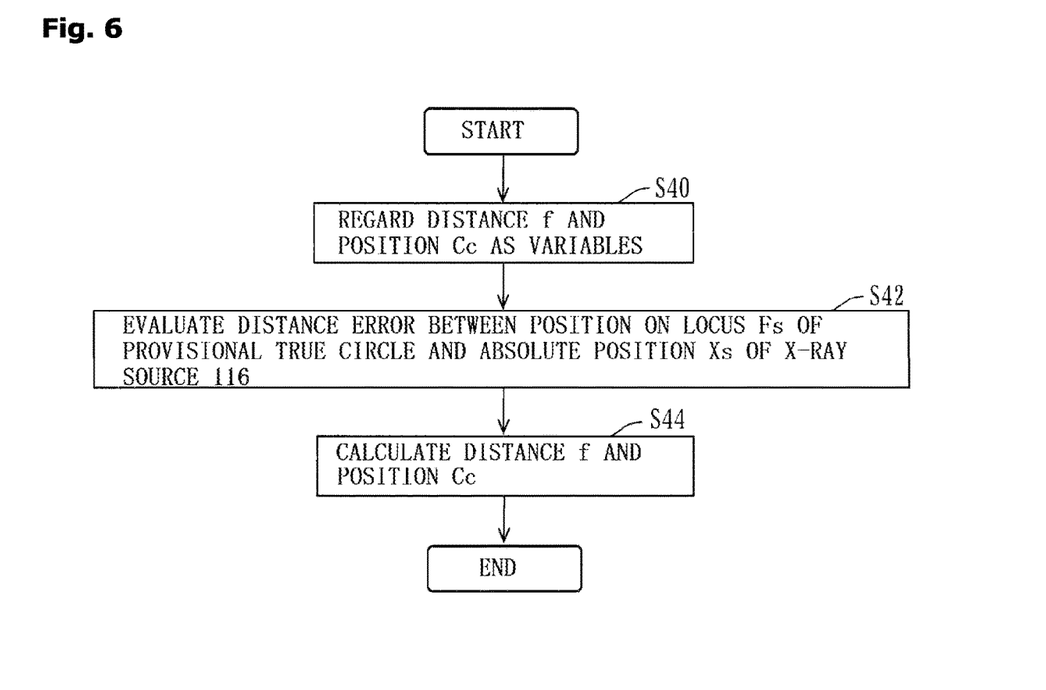
FIG. 6 is a flowchart of calculating a distance between the X-ray source and an X-ray image detector, and a position of a foot of a normal from the X-ray source to the X-ray image detector, after the absolute position of the X-ray source is calculated.

First, when the absolute position Xs of the X-ray source 116 in the k-th assumed rotational position is calculated, the distance f between the X-ray source 116 and the X-ray image detector 124 as well as the position Cc (cx and cy) of the foot of the normal from the X-ray source 116 to the X-ray image detector 124 are regarded as variables (step S40 of FIG. 6). Then, a distance error between a position on a locus Fs of a provisional true circle and the absolute position Xs of the X-ray source 116 is evaluated (step S42 of FIG. 6). Here, the provisional true circle is obtained by fitting the absolute position Xs of the X-ray source 116 to a true circle in the k-th assumed rotational position calculated on the basis of the projection transformation matrix Hk. Then, the distance f and the position Cc which minimize the distance error are calculated (step S44 of FIG. 6).

Specifically, for example, the distance f is temporarily set at an appropriate value, and the position Cc is varied so as to calculate the position Cc which minimizes the distance error. Next, the position Cc which minimizes the distance error is temporarily set, and the distance f is varied so as to calculate the distance f which minimizes the distance error. The distance f which minimizes the distance error is temporarily set, and the position Cc is varied so as to calculate the position Cc which minimizes the distance error. The position Cc which minimizes the distance error is temporarily set, and the distance f is varied again so as to calculate the distance f which minimizes the distance error. Repeating these processes several times makes it possible to calculate the distance f and the position Cc which minimize the distance error, thus allowing optimization of the distance f and the position Cc.

Next, referring back to FIG. 4, a center position Cp of a locus Fs fitted to the true circle (provisional true circle) is calculated from variation in the absolute positions Xs(1 to N) of the X-ray source 116, and the center position Cp is set as the rotation center position Cp of the rotating table 120. To be more specific, the Q number of absolute positions Xs of the X-ray source 116 are fitted to a true circle (step S20 of FIG. 4). If Q>3 at this time, the rotation center position Cp of the true circle is calculated by, for example, a least square method. If Q=3, the rotation center position Cp of the true circle is calculated by, for example, a simultaneous equation.

Then, for example, an angle of inclination of the locus Fs fitted to a true circle relative to a horizontal plane (xz plane) is calculated. Then, the rotation center position Cp and the rotary axis Ax of the rotating table 120 are calculated (step S22 of FIG. 4). At this time, the host computer 128 may calculate the center position Cp of the true circle and the locus Fb thereof with respect to each of the twelve (N=12) spheres 106. Therefore, the rotation center position Cp may be calculated by averaging the center positions Cp of the true circles of the twelve spheres 106. The angle of inclination of the rotary axis Ax can be calculated by averaging the inclinations of the loci Fb of the true circles of the twelve spheres 106 relative to the horizontal plane, in order to calculate the rotary axis Ax.

As described above, in the present embodiment, it is possible to calculate the rotation center position Cp of the rotating table 120 in an extremely simple series of processes. That is, the calibration tool 102 having twelve spheres 106, the shape of which can be specified from the projected images to the X-ray image detector 124 and which are arranged at the known relative positional intervals Pu and Pv, is mounted on the rotating table 120, and the projected images of the calibration tool 102 are captured while the rotating table 120 is set at three rotational angles. That is, the present embodiment eliminates the need for generating three-dimensional volume data to calculate the rotation center position Cp.

In the present embodiment, since all the spheres 106 are disposed on only the single plane of the calibration tool 102, the transformation matrix for projective transformation of the spheres 106 in the k-th rotational position Posk to the detection surface 124A of the X-ray image detector 124 is the projection transformation matrix Hk. Therefore, the rotation center position Cp of the rotating table 120 can be calculated with the use of only four of the twelve spheres 106 as targets of calculation in each step, thus allowing further reduction in calculation time. In the present invention, since not the four spheres 106 but all the twelve spheres 106 are used as targets of calculation in each step, it is possible to calculate the rotation center position Cp of the rotating table 120 with extremely high accuracy.

In the present embodiment, the rotary axis Ax of the rotating table 120 is calculated in the center position calculation step. Therefore, even if it is assumed that the rotary axis Ax of the rotating table 120 does not require calibration, it is possible to properly evaluate the necessity of calibration, in comparison with a result of actual calculation of the rotary axis Ax of the rotating table 120.

In the present embodiment, on an assumption that the X-ray source 116 and the X-ray image detector 124, instead of the rotating table 120, are rotated in the center position calculation step, the absolute position Xs of the X-ray source 116 for each rotation by the predetermined angle α is calculated from the projection transformation matrix Hk, and thereby the rotation center position Cp of the rotating table 120 is calculated. That is, not the absolute positions Xa of the spheres 106 but the absolute positions Xs of the X-ray source 116 are calculated. Therefore, the direct use of the projection transformation matrix Hk results in reduction in computation amount, thus achieving quick calibration. The present embodiment is not limited to this, the rotation center position Cp of the rotating table 120 may be calculated by calculating the absolute positions Xa of the spheres 106.

In the present embodiment, when the rotating table 120 is rotated four or more times by the predetermined angle α, and the Q number of absolute positions Xs of the X-ray source 116 are calculated, the distance f between the X-ray source 116 and the X-ray image detector 124 as well as the position Cc (cx and cy) of the foot of the normal from the X-ray source 116 to the X-ray image detector 124 are regarded as variables. The distance error between the position on the locus Fs of the provisional true circle as well as each of the Q number of absolute positions Xs of the X-ray source 116 is evaluated. Here, the provisional true circle is obtained by fitting the Q number of absolute positions Xs of the X-ray source 116 calculated on the basis of the projection transformation matrixes Hk(k=1 to Q) to the true circle. By doing so, the distance f between the X-ray source 116 and the X-ray image detector 124 as well as the position Cc (cx and cy) of the foot of the normal from the X-ray source 116 to the X-ray image detector 124 are calculated. Therefore, when the distance f between the X-ray source 116 and the X-ray image detector 124 as well as the position Cc (cx and cy) of the foot of the normal from the X-ray source 116 to the X-ray image detector 124 are to be calibrated, the calculation of the distance f and the position Cc facilitates calibration with higher accuracy.

In the present embodiment, in the center position calculation step, the center position Cp of the locus Fs fitted to the true circle (provisional true circle) is calculated from variation in the absolute position Xs of the X-ray source 116, and the resulting center position Cp is set as the rotation center position Cp of the rotating table 120. That is, fitting to the true circle reduces the total number Q of rotational positions, and therefore allows unambiguous calculation of the center position Cp. The present embodiment is not limited to this, and the rotation center position Cp of the rotating table 120 may be calculated by other methods.

In the present embodiment, when the rotary axis Ax of the rotating table 120 is calculated, the angle of inclination of the locus Fs fitted to the true circle relative to the horizontal plane is calculated, and the rotary axis Ax is calculated from the angle of inclination and the rotation center position Cp. Accordingly, since one sphere 106 is enough to calculate the rotary axis Ax, the step of calculating the rotary axis Ax can be simplified and performed in a short time. The present embodiment is not limited to this. For example, the locus Fs obtained by fitting to a true circle may be calculated in each of spheres 106, and the rotary axis Ax may be calculated from deviation in the center position of the locus Fs.

In the present embodiment, the reference objects on the calibration tool 102 are the spheres 106. The sphere 106 has a circular outline whichever direction the images of the spheres 106 are projected. That is, the sphere 106 has the most easily identifiable shape in the image projected to the X-ray image detector 124. The present embodiment is not limited to this. The reference object may be, for example, a polyhedron such as a regular polyhedron and a deformed rhombic prism, and may have a shape containing one or more curved surfaces such as an ellipsoid and a cone.

In the present embodiment, the positions of the feature points of the projected images of the spheres 106, which are the reference objects, are the centroid positions of the projected images. Since the projected images of the spheres 106 are circular, the centroid positions can be easily calculated with less position error. The present embodiment is not limited to this. The positions of the feature points of the projected images of the spheres 106, which are the reference objects, may be respective center positions. In the first place, the reference object may not be a sphere. For example, a partially characteristic recess or projection provided in the calibration tool 102 may serve as a reference object, and the characteristic recess or projection may be associated with a feature point of a projected image.

That is, in the present embodiment, it is possible to easily calculate the rotation center position Cp of the rotating table 120 on which an object to be measured is mounted in a rotatable manner, with a simple process.

In the foregoing embodiment, all the spheres 106 are disposed on only a single plane of the calibration tool 102, but the present invention is not limited thereto. For example, in the calibration tool 102, all the spheres 106 may not be disposed on a single plane but may be disposed three-dimensionally. In that case, the number of the spheres 106 is at least six or more, and a projection matrix Pk is used instead of the projection transformation matrix Hk. The host computer 128 can calculate the absolute position Xs of the X-ray source 116 from the projection matrix Pk of three rows and four columns in the k-th assumed rotational position using the following expression (5) related to the projection matrix Pk, instead of the expression (3).

$$Pk = A[rk1\ rk2\ rk3\ Tk] \quad (5)$$

In this case, using the projection matrix Pk allows calibration with high accuracy, even if the calibration tool 102 has poor flatness.

In the foregoing embodiment, the number of the spheres 106 is at least 4 (or 6), but the present invention is not limited thereto. For example, the calibration tool 102 may be configured such that there is one sphere 106 and the one sphere 106 is moved to and disposed in at least four positions (or six positions).

In the foregoing embodiment, as shown in FIGS. 3A and 3B, the spheres 106 are disposed at the constant relative positional intervals Pu and Pv in the u- and v-axis directions, respectively, but the present invention is not limited thereto. For example, the relative positional intervals Pu and Pv may be variable between the spheres 106, and the spheres 106 are not necessarily arranged in the u- and v-axis directions. This is not limited to a case where the spheres 106 are disposed two-dimensionally on the plane, but the same goes for a case where the spheres 106 are disposed three-dimensionally.

The present invention can be widely applied to calibration of the X-ray measuring devices.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A calibration method for an X-ray measuring device that performs three-dimension measurement of an object to be measured using an X-ray,
   the X-ray measuring device including an X-ray source that generates an X-ray, a rotating table on which the object to be measured is mounted in a rotatable manner, and an X-ray image detector that detects the X-ray having passed through the object to be measured,
   the calibration method comprising:
   mounting a calibration tool in which one or more reference objects having a shape identifiable by a projected image to the X-ray image detector can be disposed at known relative positional intervals in N (N≥4) or more positions, on the rotating table;
   identifying a position of a feature point of the projected image of each of the one or more reference objects in the N positions, from an output of the X-ray image detector while the X-ray is applied to the calibration tool;
   calculating a transformation matrix for projective transformation of the one or more reference objects on a detection surface of the X-ray image detector, on a basis of the position of the feature point of the projected image of each of the one or more reference objects in the N positions and the known relative positional intervals;
   repeating to identify the position of the feature point of the projected image of each of the one or more reference objects in the N positions, from the output of the X-ray image detector while the X-ray is applied to the calibration tool and to calculate the transformation matrix for projective transformation of the one or more reference objects on the detection surface of the X-ray image detector, on the basis of the position of the feature point of the projected image of each of the one or more reference objects in the N positions and the known relative positional intervals, while the rotating table is rotated twice or more by a predetermined angle; and
   calculating a rotation center position of the rotating table on a basis of the transformation matrix.

2. The calibration method for an X-ray measuring device according to claim 1, wherein when all the one or more reference objects are disposed on only a single plane of the calibration tool, the transformation matrix is defined as a projection transformation matrix, and when the one or more reference objects are disposed in three dimensions, N is 6 and the transformation matrix is defined as a projection matrix.

3. The calibration method for an X-ray measuring device according to claim 1, wherein in calculating the rotation center position of the rotating table on the basis of the transformation matrix, a rotary axis of the rotating table is further calculated.

4. The calibration method for an X-ray measuring device according to claim 1, wherein in calculating the rotation center position of the rotating table on the basis of the transformation matrix, on an assumption that the X-ray source and the X-ray image detector rotate instead of the rotating table, the rotation center position of the rotating table is calculated by calculating an absolute position of the X-ray source for each rotation by the predetermined angle on the basis of the transformation matrix.

5. The calibration method for an X-ray measuring device according to claim 4, wherein when the absolute position of the X-ray source is calculated by rotating the rotating table four times or more at the predetermined angle, a distance between the X-ray source and the X-ray image detector and a position of a foot of a normal from the X-ray source to the X-ray image detector are regarded as variables, and a distance error between a position on a locus of a provisional true circle and the absolute position of the X-ray source is evaluated so as to calculate the distance between the X-ray source and the X-ray image detector and the position of the foot of the normal from the X-ray source to the X-ray image detector, the provisional true circle being obtained by fitting the absolute positions of the X-ray source calculated on a basis of the transformation matrix to a true circle.

6. The calibration method for an X-ray measuring device according to claim 4, wherein in calculating the rotation center position of the rotating table on the basis of the transformation matrix, a center position of a locus obtained by fitting change in the absolute position of the X-ray source to a true circle is calculated, and the center position is set as the rotation center position of the rotating table.

7. The calibration method for an X-ray measuring device according to claim 6, wherein in calculating the rotary axis of the rotating table, an angle of inclination from a horizontal plane of the locus is further calculated, and the rotary axis is calculated from the angle of inclination and the rotation center position.

8. The calibration method for an X-ray measuring device according to claim 1, wherein each of the one or more reference objects is a sphere.

9. The calibration method for an X-ray measuring device according to claim 1, wherein the position of the feature point of the projected image of each of the one or more reference objects is a centroid position of the projected image.

* * * * *